(12) United States Patent
Wildeman

(10) Patent No.: US 12,226,990 B2
(45) Date of Patent: Feb. 18, 2025

(54) STITCH BONDED WIPE

(71) Applicant: TIETEX INTERNATIONAL LTD., Spartanburg, SC (US)

(72) Inventor: Martin Wildeman, Spartanburg, SC (US)

(73) Assignee: TIETEX INTERNATIONAL, LTD., Spartanburg, SC (US)

( * ) Notice: Subject to any disclaimer, the term of this patent is extended or adjusted under 35 U.S.C. 154(b) by 1254 days.

(21) Appl. No.: 16/606,024

(22) PCT Filed: Apr. 13, 2018

(86) PCT No.: PCT/US2018/027530
§ 371 (c)(1),
(2) Date: Oct. 17, 2019

(87) PCT Pub. No.: WO2018/194924
PCT Pub. Date: Oct. 25, 2018

(65) Prior Publication Data
US 2022/0184919 A1    Jun. 16, 2022

Related U.S. Application Data

(60) Provisional application No. 62/486,619, filed on Apr. 18, 2017.

(51) Int. Cl.
*B32B 5/06* (2006.01)
*A47L 13/16* (2006.01)
(Continued)

(52) U.S. Cl.
CPC ............... *B32B 5/06* (2013.01); *A47L 13/16* (2013.01); *B32B 5/022* (2013.01); *B32B 7/09* (2019.01);
(Continued)

(58) Field of Classification Search
CPC .. B32B 5/06; B32B 5/022; B32B 7/09; B32B 9/02; B32B 9/047; B32B 2250/03;
(Continued)

(56) References Cited

U.S. PATENT DOCUMENTS

2008/0280094 A1    11/2008    Wildeman
2010/0263152 A1*   10/2010    Wildeman ............ A47L 13/256
                                                                15/228

FOREIGN PATENT DOCUMENTS

EP          0945251 A1      9/1999

OTHER PUBLICATIONS

International preliminary report on patentability for PCT/US2018/027530.

* cited by examiner

*Primary Examiner* — Maria V Ewald
*Assistant Examiner* — Ethan Weydemeyer
(74) *Attorney, Agent, or Firm* — J. M. Robertson, LLC

(57) ABSTRACT

A wipe structure of stitch bonded construction incorporating at least one inner layer of cellulose tissue disposed in sandwiched relation between a first discontinuous cover layer of spunbonded polypropylene fleece and a second discontinuous cover layer of spunbonded polypropylene fleece such that the inner layer, the first discontinuous cover layer and the second discontinuous cover layer form a stacked composite and a plurality of stitching yarns extending in stitched relation through the stacked composite.

16 Claims, 2 Drawing Sheets

Figure 1:
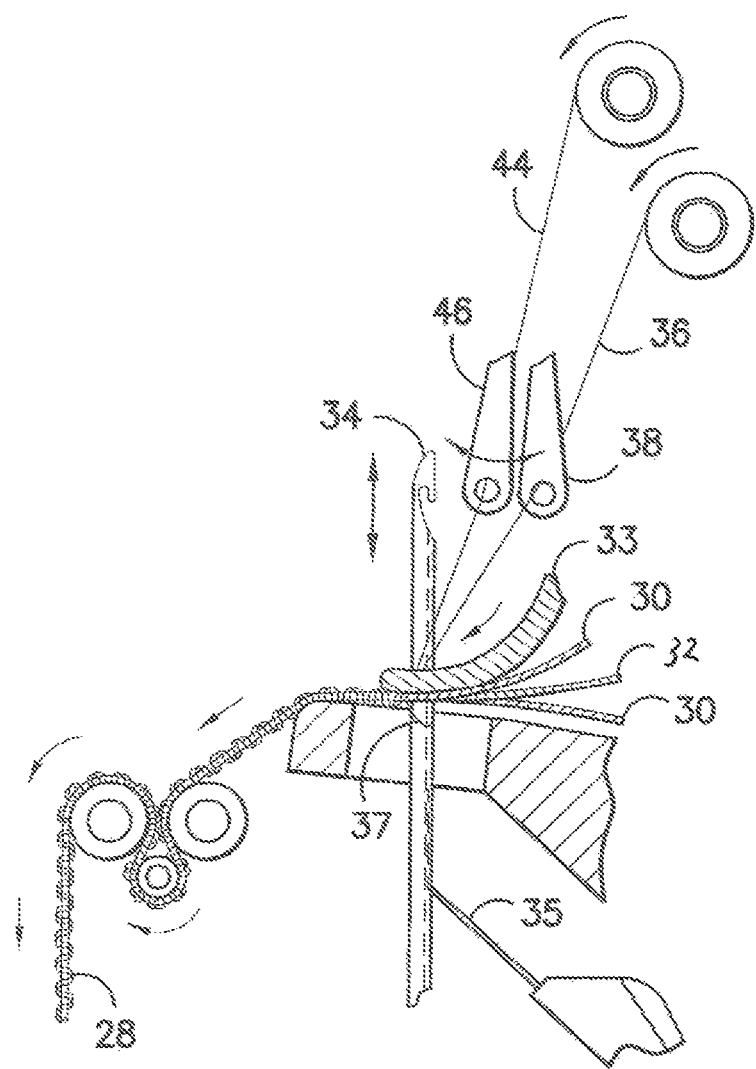

(51) Int. Cl.
  *B32B 5/02*    (2006.01)
  *B32B 7/09*    (2019.01)
  *B32B 9/02*    (2006.01)
  *B32B 9/04*    (2006.01)

(52) U.S. Cl.
  CPC ............... *B32B 9/02* (2013.01); *B32B 9/047* (2013.01); *B32B 2250/03* (2013.01); *B32B 2250/40* (2013.01); *B32B 2262/0253* (2013.01); *B32B 2307/728* (2013.01); *B32B 2307/73* (2013.01); *B32B 2432/00* (2013.01)

(58) Field of Classification Search
  CPC ........ B32B 2250/40; B32B 2262/0253; B32B 2307/728; B32B 2307/73; B32B 2432/00; A47L 13/16
  See application file for complete search history.

STITCH BONDED WIPE

CROSS REFERENCE TO RELATED APPLICATION(S)

This application claims the benefit of, and priority from, U.S. provisional application No. 62/486,619 having a filing date of 18 Apr. 2017. The contents of such prior application are hereby incorporated by reference in their entirety as if fully set forth herein.

TECHNICAL FIELD

The present disclosure relates generally to cleaning systems for counters, floors and other surfaces. More particularly, the disclosure relates to replaceable absorbent wipes with enhanced absorbency. The wipe incorporates a construction having at least one layer of cellulose tissue or other cellular material disposed between light-weight cover layers of nonwoven polypropylene or other polymer material. At least one of the cover layers incorporates a substantially open structure such that portions of the underlying cellular material define an accessible cleaning material adapted to project through the cover layer to contact a surface to be cleaned during use. The layers may be secured together by stitch bonding to form a cohesive nonwoven structure. Exemplary non-limiting uses may include domestic or industrial cleaning of hard surfaces, floors, bathrooms, kitchens and the like.

BACKGROUND

Fabric formation using so-called stitch bonding techniques is well known. In such processes, a multiplicity of stitching yarns is passed repeatedly in stitching relation through one or more substrate layers in closely spaced rows so as to form a coordinated arrangement of surface stitches in covering relation to the substrate. It is possible to use such stitch bonding techniques to form substantially uniform surfaces covered by the stitching yarns. It is also possible to impart patterns of stitching yarns across the surface by manipulation of the formation process. Such patterns may use upstanding loops, substantially flat stitches or combinations thereof.

SUMMARY OF THE DISCLOSURE

According to one non-limiting practice, the present disclosure provides advantages and/or alternatives over the prior art by providing a wipe of stitch bonded construction incorporating a construction having at least one layer of cellulose tissue or other cellular material disposed between light weight cover layers of nonwoven polypropylene or other polymer material. The cover layers may be hydrophobic or hydrophilic. At least one of the cover layers incorporates a substantially open structure such that portions of the underlying cellular material define an accessible cleaning material adapted to project operatively across the cover layer to contact a surface to be cleaned as pressure is applied during use.

In one exemplary construction, face-forming stitching yarns of polyester or the like of microfiber filament construction may be introduced through the layers to define a cleaning face. If desired, the stitching yarns may be introduced in partially threaded stitching relation in patterns across the face with zones of raised microfiber loops separated by stitch-free zones which are free of raised microfiber loops. The wipe may attach to hooking elements across a surface of a user manipulated mop head or other structure to define a hook and loop attachment system.

In accordance with one exemplary aspect, the present disclosure provides a cleaning wipe of multi-layer, stitch-bonded construction wherein the cleaning wipe includes at least one inner layer of cellulose tissue of insufficient coherency to support stitch-bonding and having a mass per unit area of 2 grams per square meter to 50 grams per square meter. The inner layer is disposed in sandwiched relation between a first discontinuous cover layer of spunbonded polypropylene fleece and a second discontinuous cover layer of spunbonded polypropylene fleece such that the inner layer, the first discontinuous cover layer and the second discontinuous cover layer form a stacked composite. The first and second discontinuous cover layers are disposed in discontinuous covering relation across opposing surfaces of the inner layer such that at least 10 percent, and more preferably at least 25 percent to 95 percent of each opposing surface of the inner layer is not covered by an opposing discontinuous cover layer. A plurality of stitching yarns extends in continuous or discontinuous stitched relation through the stacked composite.

BRIEF DESCRIPTION OF THE DRAWING(S)

Figure 2:
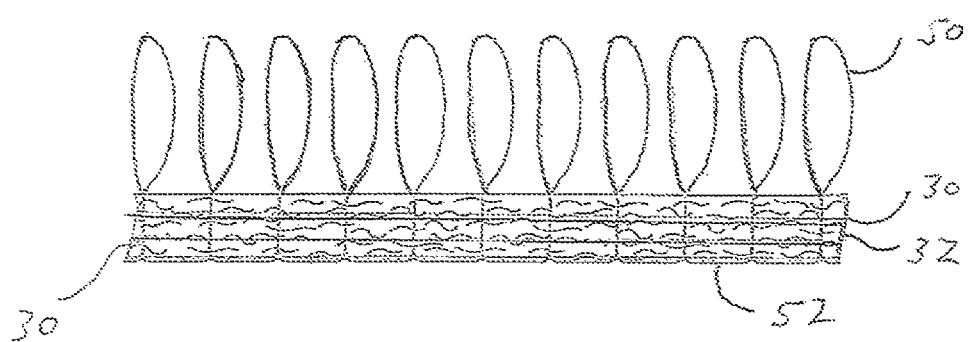

FIG. 1 illustrates schematically an exemplary two-bar stitch bonding system adapted to form a cleaning wipe material using multiple layers of material consistent with the present disclosure; and FIG. 2 is a schematic cross section of an exemplary cleaning wipe consistent with the present disclosure.

While the wipe of the present disclosure will hereinafter be described in connection with certain exemplary embodiments and practices, it is to be understood that in no event is the disclosure to be limited to such illustrated and described embodiments and practices. On the contrary, it is intended that the present disclosure shall extend to all alternatives and modifications as may embrace the general principles of this disclosure within the full and true spirit and scope thereof.

DESCRIPTION OF THE PREFERRED EMBODIMENTS

Turning now to the drawings, FIG. 1 illustrates schematically an exemplary two-bar stitch-bonding system which may be utilized to form a cleaning wipe consistent with the present disclosure. In this regard, it is to be understood that while a two-bar stitch-bonded construction is illustrated, it is likewise contemplated that other constructions such as a one-bar, or three-bar construction may be used if desired. As will be appreciated, in the stitch-bonding process, a pattern of stitches is formed by passing stitching yarns through layers of substrate material such that the stitching yarns cooperatively form at least a partial covering of stitches across the substrate material.

In the illustrated exemplary practice, at least three plies of substrate material may be conveyed to a stitch-forming position in the direction indicated by the arrows. In accordance with one exemplary practice, the upper and lower plies 30 of substrate material may each be a spun bonded hydrophilic polypropylene fleece having a mass per unit area of about 2 to 50 grams per square meter. However, higher and lower weights may be used if desired. The interior ply 32 of substrate material may be a relatively light weight cellulose tissue having a mass per unit area of about 2 to about 50 grams per square meter. However, higher and lower weights may be used if desired. The exterior layers may be either hydrophobic or hydrophilic as may be desired. In this regard, while polypropylene is naturally hydrophobic, it may be treated in accordance with well-known techniques to adopt a substantially hydrophilic character.

In accordance with one exemplary practice, at least one of the surface plies 30 may have a substantially open construction so as to provide a substantial number of interstitial surface openings at which the underlying cellulose tissue or other interior ply material remains exposed. In this regard, it is contemplated that at least about 10% of the interior ply material may remain exposed (i.e. 90% cover factor) and more preferably at least about 25% of the interior ply material remains exposed (i.e. a 75% cover factor). Even lower cover factors of about 5% or less (exposing 95% or more of the interior ply material) may be useful for various applications.

As will be appreciated, the structure is not limited to three plies. Rather, it is contemplated that multiple plies of the identified substrate materials may be used at any of the positions indicated if desired. Thus, two or more plies of cellulose tissue may be used at the indicated interior position. Likewise, two or more plies of polypropylene spunbond material may be used on either side of the cellulose tissue. In the event that multiple plies of a substrate material are used, such multiple plies cooperatively form the stitching substrate structure.

As will be appreciated, cellulose tissue may be characterized by relatively low coherency and would generally be unsuitable for use as a wipe. Likewise, polypropylene spunbond material may have relatively poor absorbency, even after hydrophilic treatment. However, it has been found that the use of a sandwich structure wherein a cellulose tissue is positioned between covering layers of polypropylene spunbond material may provide substantially enhanced durability due to the polypropylene in combination with excellent absorbency due to the cellulose tissue. Moreover, the presence of the cellulose tissue provides enhanced opacity which may be desirable in some environments of use.

The use of relatively low cover factors at the outside layers permits the cellulose tissue or other interior layer material to be exposed during use. Thus, as pressure is applied by a user during a wiping operation, the interior layer material may be caused to project outwardly through the interstices in the cover layers to define a discontinuous operative wiping surface made up of individual points of the interior layer material. At the same time, the polypropylene of other surface material continues to provide stability to the projecting points of low coherency tissue thereby making the overall structure suitable for cleaning operations.

As indicated previously, the plys 30, 32 may be joined together by stitch bonding to maintain the desired layered structure. As illustrated, the stitch bonding machine typically incorporates a row of reciprocating needles 34 (only one shown) extending in adjacent relation to one another across the width of the multi-ply stitching substrate. So called "sinker fingers" 33 (also known as nebs) may extend from a sinker bar for disposition between the needles to aid in pressing the plies of substrate material together and to hold segments of stitching yarns which cross between needles in slightly raised relation from the substrate material 30. The sinker fingers 33 may also be eliminated if desired. By way of example only, and not limitation, the sinker fingers 33 may have a height of about 0.5 mm to 4 mm and most preferably about 2 mm although other sizes may likewise be used.

According to the illustrated exemplary practice, two yarn systems (i.e. two bars) may be used to form stitches through the multi-ply substrate. However, other stitching systems such as one-bar and three-bar systems may likewise be used if desired. By way of example only, and not limitation, in the illustrated two bar construction, ground yarns 36 forming a first yarn system carried by a first guide 38 may be stitched in a chain stitch arrangement across the multi-ply substrate. By way of example only, and not limitation, the ground yarns 36 may have a linear density of about 20 denier to about 300 denier. One such suitable yarn is 40 denier/12 filament fully oriented polyester yarn. However, other yarn constructions and filament counts including monofilament may likewise be utilized if desired.

In the illustrated exemplary construction, a second group of surface yarns 44 may be carried by a second guide 46 for cooperative engagement with the needles 34. By way of example only, and not limitation, the surface yarns 44 may have a linear density of about 20 denier to about 300 denier. One such suitable yarn is a 40 denier/12 filament fully oriented polyester yarn. However, other yarn constructions and filament counts may likewise be utilized if desired.

In accordance with one exemplary practice, any of the stitching yarns may be microfiber yarns formed from ultra-fine fibers of less than 1 denier per filament (dpf). Such yarns are characterized by a soft feel and very high effective surface area. In this regard, such microfiber yarns may be made up of at least a predominant percentage of fiber with a dpf level of less than 0.8 and will more preferably be made up of at least a predominant percentage of fiber with a dpf level of less than 0.6 and will most preferably be made up of at least a predominant percentage of fiber with a dpf level of less than 0.4 when evaluated on a weight basis. That is, according to the potentially preferred practice, 51% or more of the fiber weight in the stitching yarns may be made up of fibers with these dpf levels. In accordance with one exemplary embodiment, such microfiber yarns may be formed substantially entirely from fiber with a dpf level of about 0.4 or less. By way of example only, and not limitation, one such microfiber yarn construction is a 150/288 (i.e. 150 denier, 288 filament) textured polyester yarn. While polyester may be potentially desirable for the microfiber stitching yarns, other natural or synthetic materials including nylon, polypropylene, cotton or blends of any identified materials also may be used if desired.

As will be appreciated by those of skill in the art, during the stitch-bonding process a needle 34 (shown in greatly exaggerated dimension) pierces the substrate material and engages stitching yarns delivered into position by the yarn guides such that the stitching yarns are captured within a hook portion of the needle 34. As the needle is reciprocated downwardly, a closing element 35 such as a closing wire which moves relative to the needle 34 closes the hook portion to hold the stitching yarns therein. With the hook portion closed, the captured stitching yarns are pulled through the interior of an immediately preceding yarn loop 37 disposed around the shank of the needle 34 at a position below the substrate material 30. As the captured stitching yarns are pulled through the interior of the preceding yarn loop 37 a stitch is formed which is knocked off of the needle 34. As the needle 34 is raised back through the substrate material 30, the hook portion is reopened and a new yarn loop 37 moves out of the hook portion and is held around the shank of the needle 34 for acceptance of captured yarns and formation of a subsequent stitch during the next down stroke. During this process individual stitching yarns may be held at a single needle 34 or may be shifted back and forth laterally between needles.

According to one exemplary practice the surface yarns may be delivered in partially threaded pattern for cooperative engagement with a first group of the needles 34 across the width of the stacked substrate materials. A second group of the needles 34 across the width is not engaged by the surface yarns. This partial threading of the needles 34 results in creating spaced voids in the stitching pattern thereby providing stitched zones and stitch free zones arranged in stripes or other patterns. If desired, during the stitch formation practice, the surface yarns 44 may be looped over the sinker fingers 33 as they pass between adjacent reciprocating needles thereby producing an arrangement of face loops 50 projecting outwardly away from the so called "technical back" of the resultant composite. Flat locking stitches 52 are formed across the so called "technical face" of the resultant composite. In accordance with one exemplary practice, a pile sinker height of about 2 to 6 millimeters (most preferably 4 millimeters) may be used although greater or lesser heights may be used if desired. Of course, flat stitches may be formed across both faces if desired.

Following stitching, the resultant stitch-bonded wipe material 28 may be segmented in the machine and cross-machine directions to yield a cleaning wipe or pad with desired dimensions. As will be appreciated, while an exemplary cleaning wipe is typically rectangular, the stitch-bonded wipe material 28 may be segmented to provide virtually any shape as may be desired.

Of course, variations and modifications of the foregoing are within the scope of the present disclosure. Thus, it is to be understood that the disclosure disclosed and defined herein extends to all alternative combinations of two or more of the individual features mentioned or evident from the text and/or drawings. All of these different combinations constitute various alternative aspects of the disclosure. The embodiment described herein explain the best modes for practicing the disclosure and will enable others skilled in the art to utilize the disclosure.

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Various features of the disclosure are set forth in the following claims.

The invention claimed is:

1. A cleaning wipe of multi-layer, stitch-bonded construction, the cleaning wipe comprising:

at least one inner layer of cellulose tissue of insufficient coherency to support stitch-bonding and having a mass per unit area of 2 grams per square meter to 50 grams per square meter, the inner layer disposed in sandwiched relation between a first discontinuous cover layer of spunbonded polypropylene fleece and a second discontinuous cover layer of spunbonded polypropylene fleece such that the inner layer, the first discontinuous cover layer and the second discontinuous cover layer form a stacked composite and wherein the first and second discontinuous cover layers are disposed in discontinuous covering relation across opposing surfaces of the inner layer such that at least 10 percent of each opposing surface of the inner layer is not covered by an opposing discontinuous cover layer; and a plurality of stitching yarns extending in stitched relation through the stacked composite.

2. The cleaning wipe as recited in claim 1, wherein the stitching yarns are textured polyester yarns made up predominantly of microdenier filaments having a linear density of less than 1 denier per filament.

3. The cleaning wipe as recited in claim 1, wherein the stitching yarns are textured polyester yarns made up predominantly of microdenier filaments having a linear density of less than 0.8 denier per filament.

4. The cleaning wipe as recited in claim 1, wherein the stitching yarns are textured polyester yarns made up predominantly of microdenier filaments having a linear density of less than 0.6 denier per filament.

5. The cleaning wipe as recited in claim 1, wherein the stitching yarns are textured polyester yarns made up predominantly of microdenier filaments having a linear density of less than 0.4 denier per filament.

6. The cleaning wipe as recited in claim 1, wherein each of the first discontinuous cover layer and the second discontinuous cover layer have a mass per unit area of 2 grams per square meter to 50 grams per square meter.

7. The cleaning wipe as recited in claim 6, wherein at least one of the first discontinuous cover layer and the second discontinuous cover layer comprises hydrophilic polypropylene fleece.

8. The cleaning wipe as recited in claim 6, wherein each of the first discontinuous cover layer and the second discontinuous cover layer comprises hydrophilic polypropylene fleece.

9. The cleaning wipe as recited in claim 6, wherein at least one of the first discontinuous cover layer and the second discontinuous cover layer comprises hydrophobic polypropylene fleece.

10. The cleaning wipe as recited in claim 6, wherein each of the first discontinuous cover layer and the second discontinuous cover layer comprises hydrophobic polypropylene fleece.

11. The cleaning wipe as recited in claim 1, wherein the stitching yarns are disposed in a discontinuous patterned stitched relation through discrete selected zones of the stacked composite such that the stitching yarns form a patterned array of stitched zones and stitch-free zones across the cleaning wipe.

12. The cleaning wipe as recited in claim 11, wherein the stitching yarns define a plurality of surface loops within stitched zones.

13. The cleaning wipe as recited in claim 1, wherein at least 25 percent of each opposing surface of the inner layer is not covered by an opposing discontinuous cover layer.

14. A cleaning wipe of multi-layer, stitch-bonded construction, the cleaning wipe comprising:

at least one inner layer of cellulose tissue of insufficient coherency to support stitch-bonding and having a mass per unit area of 2 grams per square meter to 50 grams per square meter, the inner layer disposed in sandwiched relation between a first discontinuous cover layer of spunbonded polypropylene fleece and a second discontinuous cover layer of spunbonded polypropylene fleece such that the inner layer, the first discontinuous cover layer and the second discontinuous cover layer form a stacked composite and wherein the first and second discontinuous cover layers are disposed in discontinuous covering relation across opposing surfaces of the inner layer such that at least 25 percent of each opposing surface of the inner layer is not covered by an opposing discontinuous cover layer; and a plurality of stitching yarns extending in stitched relation through the stacked composite wherein the stitching yarns are textured polyester yarns made up predominantly of microdenier filaments having a linear density of less than 1 denier per filament and wherein each of the first discontinuous cover layer and the second discontinuous cover layer have a mass per unit area of 2 grams per square meter to 50 grams per square meter.

15. The cleaning wipe as recited in claim 14, wherein the stitching yarns are disposed in a discontinuous patterned stitched relation through discrete selected zones of the stacked composite such that the stitching yarns form a patterned array of stitched zones and stitch-free zones across the cleaning wipe.

16. The cleaning wipe as recited in claim 11, wherein the stitching yarns define a plurality of surface loops within stitched zones.

\* \* \* \* \*